May 19, 1964  T. IMMESBERGER  3,133,622
CONVEYER

Filed July 16, 1962  2 Sheets-Sheet 1

INVENTOR.
THEOBALD IMMESBERGER
BY
ATTORNEY

May 19, 1964   T. IMMESBERGER   3,133,622
CONVEYER
Filed July 16, 1962   2 Sheets-Sheet 2
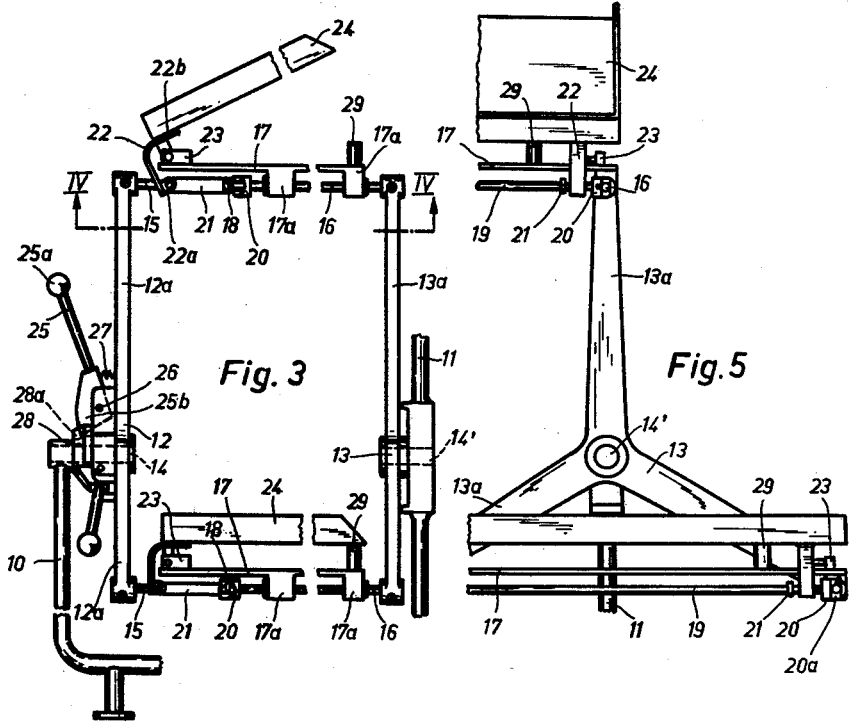
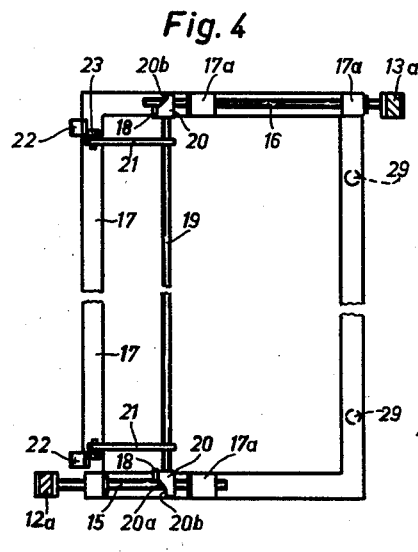
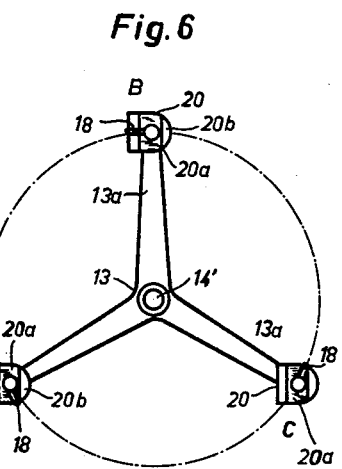
INVENTOR.
THEOBALD IMMESBERGER
BY
ATTORNEY

United States Patent Office 3,133,622
Patented May 19, 1964

3,133,622
CONVEYER
Theobald Immesberger, Kaiserslautern, Pfalz, Germany, assignor to G. M. Pfaff AG, Kaiserslautern, Pfalz, Germany, a corporation of Germany
Filed July 16, 1962, Ser. No. 210,007
Claims priority, application Germany July 20, 1961
11 Claims. (Cl. 198—19)

The present invention relates to conveyers, more particularly, though not limitatively, to conveyer systems comprising a main conveyer, such as an endless belt or chain, for supplying or transporting work pieces or articles, or containers containing the same, from a central location or station to one or more operating or processing stations, by means of the incoming strand of said conveyer, in respect to a receiving point, and for returning the finished or processed articles or containers to said central station by means of the outgoing strand of said conveyer.

An important object of the invention is the provision, especially in connection with a main conveyer system of the type referred to, of a secondary storage or magazine conveyer located at the operating stations for intermittently receiving the work pieces or containers discharged from the incoming strand of a main conveyor belt or chain and for temporarily storing an adequate number of work pieces or containers, respectively, for consecutive and uninterrupted use or processing and return of the processed pieces or articles to the central station by the outgoing strand of said main conveyer.

With the foregoing and further objects in view, as will appear hereafter, the invention, according to one of its aspects, is concerned specifically with an improved storage or magazine conveyer adapted for cooperation with a main conveyer arranged with its incoming strand located above or below the outgoing strand in respect to a receiving point or processing station, such as in the form of an endless belt or chain having its opposite and parallel strands moving in different directions and vertical planes.

In the case of centrally controlled conveyer systems of the general type referred to, the work pieces or containers holding the same are transported from a central station to the various operating or receiving stations by the incoming strand of a main conveyer belt or chain, while the processed or finished pieces, or containers are returned to said central station by the outgoing strand of said conveyer. At the operating points or stations, the work pieces are discharged or removed automatically from the conveyer and deposited upon a support or platform located at the same level as the incoming conveyer strand and normally having a limited size or area such as to be able to receive not more than two containers at a time, that is, one container being worked from and a second container being temporarily stored or held in reserve. On the other hand, if it is desired to store or hold in reserve at least two or more containers or work pieces, in addition to the container being worked from, such as required for instance in connection with processing or finishing operations involving relatively short processing times or operating periods, it becomes necessary to temporarily deposit the containers upon a further support disposed either between the strands of the main conveyer or below the latter, respectively. As a consequence, the operator will be compelled to change the position of each container a total of at least three times, namely, to first remove the incoming container from an upper support or platform, assuming the incoming strand of the conveyer to be at a higher level than the outgoing strand, to an intermediate position, to make room for the discharge of a new container by the conveyer, to thereafter remove the container from said intermediate (storage) position to the working or operating position for use during the processing operation, and finally to return the empty containers, or containers containing the processed articles or work pieces, by placing the same upon the outgoing conveyer strand. As will be understood, this involves a considerable expenditure of energy on the part of the operator with the removal of the containers from the upper platform to the working position being extremely fatiguing on account of their relatively large weight in the fully loaded condition. Moreover, this makes it necessary for the operator to interrupt his or her work at the instant of arrival of a new container, whereby to substantially reduce the operating efficiency and economy of the machines, such as sewing machines, or processing operations involved.

Accordingly, among the more specific objects of the invention is the provision of an improved magazine or storage conveyer at an operating or processing station, for receiving and storing a plurality of work pieces, or containers containing the same, said conveyer being supplied from a main conveyer, or from any other source, by which the aforementioned and related difficulties and defects are substantially avoided or minimized; by which the received and stored pieces or containers may be displaced from a discharge position to an intermediate or storage position and from there to an operative or working position substantially instantly and with a minimum of effort on the part of the operator; and which is both simple in design and construction and can be readily adapted for use with centrally controlled conveyer systems of the general type referred to hereinbefore.

The invention, both as to the foregoing and ancillary objects, as well as novel aspects thereof, will be better understood from the following detailed description of a preferred practical embodiment, taken in conjunction with the accompanying drawings forming part of this specification and in which:

FIG. 3 is a side view of the storage conveyer shown in FIG. 2;

FIG. 4 is a sectional view taken on line IV—IV of FIG. 3;

FIG. 5 is a fractional front view of the auxiliary conveyer structure shown by the preceding figures; and FIG. 6 is a fractional view showing one of the rotary star-shaped supporting structures of the auxiliary conveyer and being explanatory of the control of the supporting trays from an operative to a discharge position, and vice versa, in response to the conveyer operation or rotation.

Like reference numerals denote like parts and elements throughout the different views of the drawings.

Figure 1:
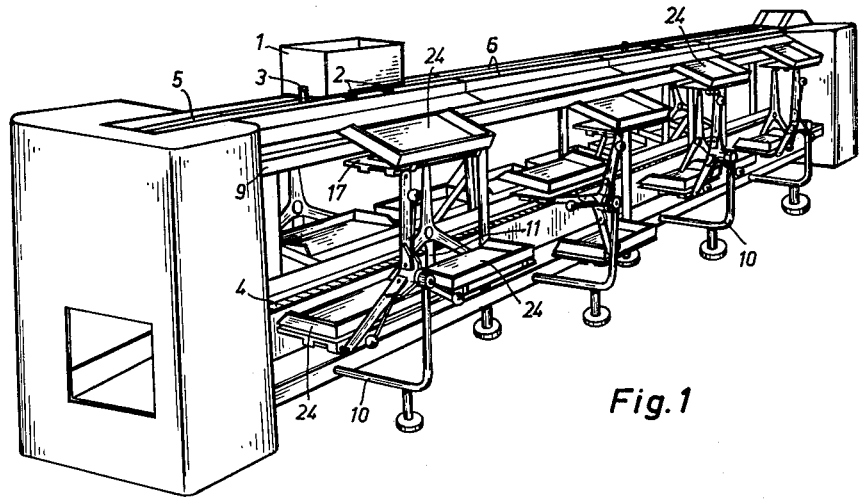
FIG. 1 is a perspective view of a centrally controlled conveyer system of the type referred to, comprising a main conveyer for supplying a number of operating or processing stations and embodying a plurality of auxiliary storage conveyers constructed and operated in accordance with the principles of the invention.

With the foregoing objects in view, the invention involves generally the provision of a storage conveyor, especially suitable for use in connection with a main conveyor of the type referred to, and being comprised essentially of a pair of rotary star-shaped supporting structures each having a central hub and extending therefrom a plurality of radial supporting arms spaced at equal angular distances from each other, said structures having three such arms at 120° spacing angles according to the preferred embodiment shown by the drawings. Said structures are rotatably supported by a pair of parallel and horizontal shafts with the plane of one structure being spaced and parallel to the plane of the other structure.

Each pair of coordinated parallel arms of said structures are, in turn, connected through a supporting frame rotatably mounted upon the respective arms by means of supporting shafts or sliding rods extending at right angles from the ends of said arms, said arms further extending from each structure in the direction of the other structure. The supporting frames may, in turn, carry loading trays or platforms for receiving the work pieces or containers containing the same to be fed intermittently from a discharge position adjacent to the incoming strand of the main conveyor to an operating or working position through at least one intermediate or storage position by step-by-step rotation of said structures by control of a simple operating lever or the like, in the manner described in greater detail in the following. It is thus possible, for instance, assuming the use of three-arm supporting structures, to provide two reserve containers in addition to the container being worked from, thus greatly increasing the allover operating efficiency, without any added burden being placed upon the operator.

An especially efficient structural embodiment of the invention is obtained by a proper adaptation of the ordinarily available average size of the work pieces, or containers holding the same, to the available distance, at a given working point or station, between the axes of the rotary supporting structures, on the one hand, and the pivots or rotating axes of the frames or supporting platforms carried by the radial arms of said structures, on the other hand.

When using an auxiliary conveyor of the type referred to at a working station in cooperation with a main conveyer being fitted with an inclined discharge surface or slide, to facilitate the discharge of the work pieces or containers, it is necessary, especially in the case of fragile articles, to avoid any shock or vibrations to be imparted to the articles during the discharge or transition from the main conveyor to the auxiliary conveyor. This may be achieved, according to a further feature of the invention, by a control of the supporting trays or platforms being pivotally mounted upon the frames connecting the rotary supporting structures, in such a manner as to automatically operate said trays or platforms to an inclined position in line with said slide upon the arrival of the respective trays in the discharge position, and to return the trays or platforms to their normal or horizontal position, while passing through the storage and operating positions, respectively.

An especially simple construction for effecting the swinging movement of the trays or platforms is obtained by a control in response to the rotation of the conveyer structure by reason of the fact that the rotational movement of each of the supporting shafts connected to the radial arms resulting from the rotation of said structure from one to the next intermittent position, may be advantageously utilized to operate a cam associated with each of said shafts, said cams serving in turn to control the swinging movement of the respective trays or platforms through suitable coupling links or devices. More specifically, according to the preferred embodiment of the invention, control mechanism of this type, resembling in operation a simple planetary gear system, may be comprised of a pin radially extending from the supporting shafts connected to the radial arms of the rotary structures, said pins adapted to cooperate with sleeves slidably mounted upon said shafts and designed to provide a cam surface for cooperation with the respective pins. The sleeves in turn serve to control, through suitable coupling links, the trays or platforms pivotally mounted upon the respective supporting frames, whereby to intermittently operate said trays to an inclined discharge position upon arriving in the discharge position adjacent to the incoming strand of the main conveyor, in a manner as will become further apparent from the following description.

Figure 2:
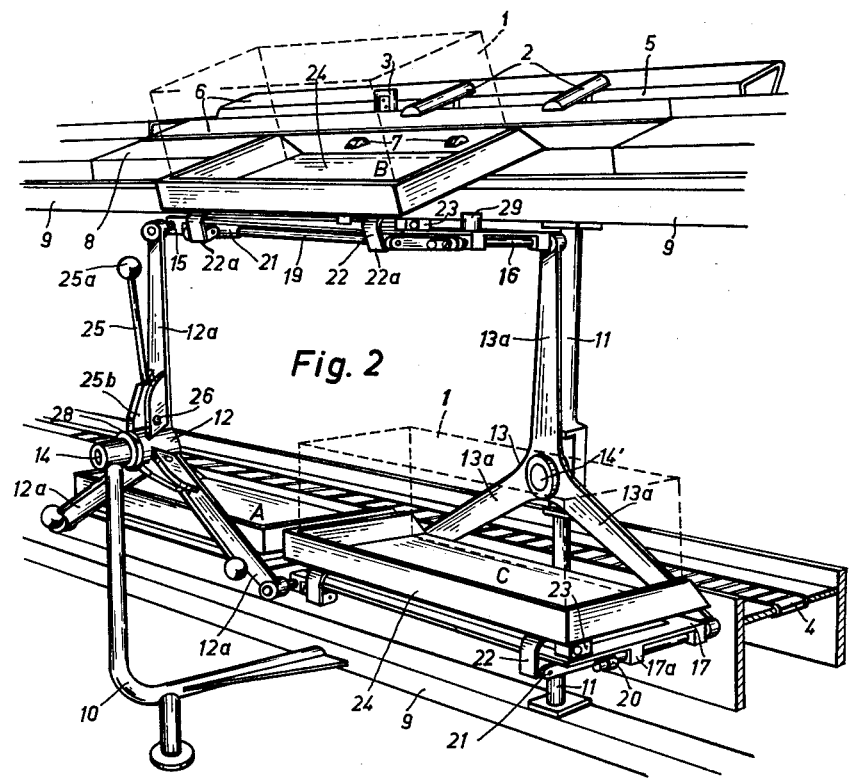
FIG. 2 is an enlarged fractional view more clearly showing the construction of the storage conveyers forming part of FIG. 1.

Referring more particularly to FIGS. 1 and 2 of the drawings, the numeral 1 representing a container for holding work pieces or articles to be processed is supported by a pair of carrier bars or rods 2 and moved in the feeding directions by the aid of pickup pins 3 or the like, both the latter and the bars 2 being connected to an endless conveyor chain 4 the upper or incoming strand of which moves within a slot or recess 5 enclosed by two platelike guide members 6 being connected with one another by any suitable means (not shown) and rotatable both in the direction of the operating or processing stations on the near side of the conveyer shown in the drawing and in the direction of the operating stations located on the opposite or far side of the conveyer, for discharging the containers 1 at the desired stations under the control of a central station, in a manner well known in connection with centrally controlled conveyor systems of this type. Further provided adjacent to the outer edges of the guide members 6 may be a number of fixed and suitably inclined discharge slides or chutes 7 mounted upon the frame or main support 9 of the conveyer and being advantageously fitted with glide rollers 8, to facilitate the discharge of the containers from the main conveyer unto the auxiliary or storage conveyers at the respective receiving points or stations.

Further connected to the frame 9 are a pair of uprights or the like supports 10 and 11 which serve to rotatably support a pair of star-shaped supporting structures 12 and 13 each having a central hub being journalled upon shafts 14 and 14' connected to the uprights 10 and 11 and extending therefrom three radial supporting arms 12a and 13a, respectively, in the example illustrated.

As seen from FIGS. 2 to 5, connected to the free or outer ends of each of the arms 12a and 13a of each supporting structure 12 and 13 and at right angles to said arms are a number of supporting shafts or sliding rods 15 and 16, respectively, with the shafts of one of said structures extending in the direction towards the other structure. The coordinated pairs of shafts 15 and 16 of both structures 12 and 13 being parallel to one another are each rotatably connected by rectangular supporting frames 17, such as by the provision of depending bearings 17a of said frames being journalled upon the coordinated shafts 16 and 17, respectively, in the manner shown in the drawings. The sliding rods or shafts 15 and 16 each carry a radial pin 18 and are further connected with one another through links 19 carrying sleeves 20 at their opposite ends. The sleeves 20 are slidably mounted upon the rods 15 and 16 and formed with lateral bevelled surfaces 20a, while leaving straight outer surfaces areas 20b parallel to the axes of the sleeves, as more clearly shown in FIGS. 4 and 6.

Connected to each of the links 19 at right angle thereto immediately adjacent to the sleeves 20 is an intermediate link 21 which, in turn, is connected to one arm 22a of a bell-crank lever 22. The levers 22 are fulcrumed or rotatably supported by bearings 23 secured to the frames 17 and have their remaining arms 22b secured to trays or platforms 24 serving to receive the work pieces or containers being discharged from and returned to the main conveyer 4.

As may be more clearly seen from FIGS. 1 to 3, there is connected to each of the arms 12 of the structure 12 a double-arm control lever 25 rotatable about a shaft or bolt 26. As more specifically shown by FIG. 3, the outwardly extending arm of each of the levers 25 being biased by means of a compression spring 27 are fitted with a control knob 25a, while the inwardly extending lever arms are fitted with locking pawls 28a, with a sleeve 28 being secured to the upright 10 normally urging a recess 28a thereof to engage said pawl, whereby to lock the structures 12, 13 in any of the consecutive discharge, storage and operating positions, respectively, of the containers 1, in a manner as will become further apparent from the following detailed description of the operation of the auxiliary or storage conveyer. Further secured to the frames 17 opposite the levers 22 are a pair of pins or stops 29 serving as rests for the trays 24 in the normal or operating position.

In operation, the seamstress or operator is supplied with work pieces to be processed from the container 1 being in the operative position marked A in FIG. 2. After all the work pieces have been processed, the container holding the processed pieces may be placed upon the lower or outgoing strand of the conveyor 4 for return to the central station. The operator then actuates the lever 25 being in the vertical position by temporarily pushing the knob 25a towards the arm 12a, whereby to cause the nose 25b to be disengaged from the slot 28a of the sleeve 28. As a consequence, the structure 12, 13 will be unlocked and caused to rotate in the clockwise direction by gravity due to the weight of the containers 1 being moved from the unloading position B to the intermediate or storage position C. This rotation will be continued until the nose 25b engages the next slot or recess 28a, thereby again locking the entire structure in the next following operating position, that is, with the container initially in the position B having moved to position C and with the container initially in the latter position having moved to the operating position A, in such a manner as to instantly provide the operator with a fresh supply of work pieces, substantially without interruption of the sewing or the like processing operation. At the same time, the tray 24 moved to the position B will be ready to receive a new container from the incoming strand of the main conveyor 4, to thereby continuously store or hold in reserve two containers for consecutive use by the operator.

During and as a result of the rotation of the structure 12, 13, a swinging movement is imparted to the trays 24 in addition to their feeding movement from positions A to B to C, in such a manner as to cause the tray arriving in the discharge or loading position B to be temporarily rotated to an angular or inclined position in line with the discharge slide 8, as more clearly shown in FIG. 2, while the trays will be automatically returned to their normal or horizontal positions while passing through the intermediate and working positions C and A, respectively, in the manner to be further described presently.

The rotation of the trays 24 between their horizontal and inclined positions in response to the rotation of the structure 12, 13 or operation of the conveyor is analogous to the function or operation of a simple conventional planetary gear system comprising an outer or ring gear, an inner or sun gear, and an intermediate planetary carrier rotatably supporting one or more planetary gears or pinions being in meshing engagement with both said ring and sun gears. In an arrangement of this type, holding stationary one of the three basic members, that is, the ring gear, the sun gear, and the planetary carrier, will enable rotary motion being transmitted between the remaining members, in a manner well known to and understood by those skilled in the art.

As applied to the control mechanism for the trays 24 according to the present invention, the links 19 carrying the sleeves 20 are relatively stationary as far as the rotation by the structure 12, 13 is concerned, whereby said links may be regarded as the equivalent to the outer ring gear of a planetary gear system of the type referred to with said ring gear being held stationary, to effect transmission of motion from the planetary carrier as driving source to the inner or sun gear as the driven member. In the present case, the sun gear is represented by the links 19 and sleeves 20 as far as their sliding or translatory movement is concerned caused by the sleeves 19 and pins 18, while the planetary carrier serving to operate said links is represented by the structure 12, 13 as the primary driving means. In other words, the distinction of the mechanism according to the present invention from the conventional planetary gear system is the fact that the links 19 acting as the driven member, corresponding to the sun gear of the planetary system, perform a sliding or translatory rather than a rotary motion, with the function of the invention being predicated upon the relatively stationary or non-rotating position of the links 19 and sleeves 20 relative to the structure 12, 13.

FIG. 6 further illustrates the control of the sleeves 20 by the follower pins 18, to control the angular position of the trays 24 relative to the frames 17 in the manner pointed out. More specifically, according to the illustration, the pin 18 shown in the position C is located at the transition point between the bevelled surface 20a and the plane outer portion 20b of the sleeve 20. While passing from position C to position A, the tray 24 need not change its angular position and during this movement rests upon the stops 29, the pins 18 being disengaged from the sleeves or moving at a relatively small distance from and parallel to the part 20b. At point or position A, the pin 18 has reached the other transition point between the plane and bevelled portions of the sleeve with the tray still remaining horizontal and resting upon the stops 29. While moving from position A to position B, on the other hand, the pin 18 engages the bevelled portion 20a of the sleeve, whereby to impart a translatory or sliding movement to the sleeve 20 along the shaft 15 or 16, respectively, and to cause the tray 24 to be swung to an inclined position such as to gradually recede from the stops 29 until reaching the final loading position B in which the inclination of the tray coincides with that of the slide 8, as shown in FIGS. 2 and 3. While moving from position B to position C, the tray 24 is returned from its inclined position to its normal or horizontal position by engagement of the pins 18 with the opposite side of the bevelled portion 20a of the sleeves 20, to cause the latter to be displaced along the rods 15 or 16 in the opposite direction and to thereby return the tray to its horizontal position upon reaching the position C, in the manner readily understood from the foregoing.

In the foregoing invention has been described in reference to a specific illustrative device or system. It will be evident, however, that variations and modifications, as well as the substitution of equivalent parts and elements for those shown herein for illustration, may be made without departing from the broader scope and spirit of the invention as set forth in the appended claims. The specification and drawings are accordingly to be regarded in an illustrative rather than in a restrictive sanse.

I claim:

1. In a conveyer system of the type described including main conveyer means having incoming and outgoing conveyer strands moving past a working station at different vertical levels, for receiving work pieces to be processed from said incoming strand and returning the processed pieces by said outgoing strand, respectively, an auxiliary conveyer at said station comprising a pair of star-shaped supporting structures each having a central hub and extending therefrom a plurality of equally angularly spaced radial supporting arms, means rotatably supporting said structures about parallel axes with the planes of the structures being parallel and displaced relative to one another in the direction of said axes, supporting shafts secured to and extending at right angles from the outer ends of each of said arms, the shafts of each said structures extending in a direction towards the other structure, a plurality of rectangular supports each having opposite sides journalled upon one pair of coordinated parallel shafts of said structures, and means to intermittently rotate said structures, to consecutively displace each said support from a loading position adjacent to said incoming strand to an operating position adjacent to said outgoing strand through at least one intermediate storage position between said loading and operating positions.

2. In a conveyer system of the type described including main conveyer means having an incoming conveyer strand disposed at a relatively high level and an outgoing strand disposed at a relatively low level, said strands moving past a working station, for receiving work pieces to be processed from said incoming strand and returning the processed pieces by said outgoing strand, respectively, an auxiliary conveyer at said station comprising a pair of star-shaped supporting structures each having a central hub and extending therefrom at least three equally angularly spaced radial supporting arms, means rotatably supporting said structures about parallel horizontal axes with the planes of the structures being parallel and displaced relative to one another in the direction of said axes, supporting shafts secured to and extending at right angles from the outer ends of said arms, the shafts of each said structures extending in a direction towards the other structure, a plurality of rectangular supports each having opposite sides journalled upon one pair of coordinated parallel shafts of said structures, and means to intermittently rotate said structures, to consecutively displace each said supports from a loading position adjacent to said incoming strand to an operating position adjacent to said outgoing strand through at least one intermediate storage position between said loading and operating positions.

3. In a conveyer system as claimed in claim 2, said last means comprising resiliently biased locking means to arrest said structures in said loading, intermediate and operating positions, and control means to temporarily release said locking means, to cause said structures to advance from one to the next of said positions by gravity.

4. In a conveyer system as claimed in claim 2, including an inclined discharge plate intermediate said incoming strand and said auxiliary conveyer, work supporting trays pivoted to each of said supports, and means responsive to the rotation of said structures to temporarily operate each said trays to an inclined position relative to said supports in alignment with said plate upon reaching its loading position relative to said incoming strand.

5. In a conveyer system as claimed in claim 4, said last means comprising a pair of sleeves each slidable upon one of the supporting shafts of each said supports and having a bevelled surface camming with a radial pin of said shafts, a link connecting the sleeves of each of said supports, and coupling mechanism between said links and the associated trays, said radial pins being angularly positioned upon their respective shafts such as to effect rotation of the trays to an inclined loading position during rotation of said structures by camming of said pins with said sleeves.

6. A rotary conveyer comprising a pair of star-shaped supporting structures each having a central hub and extending therefrom at least three equally angularly spaced radial supporting arms, means rotatably supporting said structures about separate parallel and horizontal axes with the planes of the structures being parallel and displaced relative to one another in the direction of said axes, supporting shafts secured to and extending at right angles from the outer ends of said arms, the shafts of each of said structures extending in a direction towards the other structure, a plurality of rectangular supports each having opposite sides thereof journalled upon one pair of coordinated parallel shafts of said structures, and means to intermittently rotate said structures, to consecutively displace each said supports from a loading position to an operating position through at least one intermediate storage position.

7. In a conveyer as claimed in claim 6, said last means comprising resiliently biased locking means to arrest said structures in the loaded, operating and intermediate positions, and control means to temporarily release said locking means, to cause said structures to advance from one to the next of said positions by gravity.

8. In a conveyer system of the type described including main conveyer means having incoming and outgoing conveyer strands disposed at different vertical levels and moving past an operating station, for receiving containers containing work pieces to be processed from said incoming strand and returning the containers by said outgoing strand, respectively, an auxiliary conveyer at said station comprising a pair of star-shaped supporting structures each having a central hub and extending therefrom three radial supporting arms spaced from each other by angles of 120°, means rotatably supporting said structures about parallel horizontal axes with the planes of the structures being parallel and displaced from one another in the direction of said axes, supporting shafts secured to and extending at right angles from the outer ends of said arms, the shafts of each said structures extending in a direction towards the other structure, a plurality of rectangular supporting frames each having a pair of opposite sides journalled upon one pair of coordinated parallel shafts of said structures, supporting trays carried by said frames adapted to receive said containers, and means to intermittently rotate said structures, to consecutively displace each said trays and the containers carried thereby from a loading position adjacent to said incoming strand to an operating position adjacent to said outgoing strand through an intermediate storage position between said loading and operating positions.

9. In a conveyer system as claimed in claim 8, said last means comprising resiliently biased slot and key locking means to arrest said structures in the loading, intermediate and operating positions, and control means to temporarily release said locking means, to cause said structures to advance from one to the next of said positions by gravity.

10. In a conveyer system as claimed in claim 8, including an inclined discharge plate between said incoming strand and said auxiliary conveyer, and means responsive to the rotation of said structures to operate each said trays to an inclined position relative to the frames supporting the same and in alignment with said plate upon reaching its loading position adjacent to said incoming strand.

11. In a conveyer system as claimed in claim 10, said last means comprising a pair of sleeves each slidably mounted upon one of the supporting shafts of said frames and having a bevelled surface camming with a radial pin of said shafts, a link connecting the sleeves of each support, and coupling mechanism between said links and the associated trays, said pins being angularly positioned upon their respective shafts such as to effect rotation of the trays to an inclined loading position during rotation of said structures by camming of said pins with said sleeves.

References Cited in the file of this patent
UNITED STATES PATENTS
1,269,825     Langdon _____ June 18, 1918